United States Patent [19]

Walder

[11] Patent Number: 5,056,859
[45] Date of Patent: Oct. 15, 1991

[54] MULTIPLE-USE WAGON ASSEMBLY

[76] Inventor: Daniel H. Walder, Rte. 1 Box 175, Wittenberg, Wis. 54499

[21] Appl. No.: 685,659

[22] Filed: Apr. 16, 1991

Related U.S. Application Data

[63] Continuation-in-part of Ser. No. 476,303, Feb. 7, 1990, abandoned, which is a continuation-in-part of Ser. No. 299,054, Jan. 19, 1989, abandoned.

[51] Int. Cl.⁵ ................................................. B60J 7/08
[52] U.S. Cl. ........................................ 296/180; 296/13; 296/32; 296/100; 296/181; 49/366
[58] Field of Search .................... 296/13, 14, 32, 36, 296/100, 180, 181; 292/50; 49/116, 366

[56] References Cited

U.S. PATENT DOCUMENTS

| | | | |
|---|---|---|---|
| 335,718 | 2/1886 | Price | 296/100 X |
| 516,595 | 3/1894 | Gaines | 296/32 |
| 594,621 | 11/1897 | Hartsell | 296/32 |
| 641,562 | 1/1900 | Touse | 296/13 |
| 649,181 | 5/1900 | Rowland | 296/13 |
| 1,080,948 | 12/1913 | Bigbie et al. | 296/100 |
| 1,188,318 | 6/1916 | Porterfield | 296/13 |
| 1,229,223 | 6/1917 | Burr | 296/32 |
| 1,789,619 | 1/1931 | Dodd, Jr. | 292/230 |
| 2,408,132 | 9/1946 | Weeks | 296/100 X |
| 2,551,239 | 5/1951 | Bond | 296/223 |
| 2,857,199 | 10/1958 | Thiles | 296/100 |
| 2,964,349 | 12/1960 | Picking, Jr., et al. | 296/100 X |
| 3,572,811 | 3/1971 | Kasten | 296/26 |
| 3,858,744 | 1/1975 | Garvert | 296/100 X |
| 3,861,737 | 1/1975 | Kirkbride | 296/100 |
| 4,013,018 | 3/1977 | Hansen et al. | 296/100 X |
| 4,210,358 | 7/1980 | Sweet et al. | 296/100 |
| 4,220,431 | 9/1980 | Place et al. | 296/181 X |
| 4,405,169 | 9/1983 | Allard et al. | 296/3 |
| 4,416,485 | 11/1983 | Long | 296/100 X |
| 4,460,214 | 7/1984 | Kuhns | 296/181 X |
| 4,542,931 | 9/1985 | Walker, Jr. | 296/100 |
| 4,585,267 | 4/1986 | Friesen | 296/100 |
| 4,695,087 | 9/1987 | Hollrock | 296/100 X |
| 4,848,828 | 7/1989 | Hunt | 296/100 |
| 4,943,108 | 7/1990 | Turnbull | 296/100 |

FOREIGN PATENT DOCUMENTS

| | | | |
|---|---|---|---|
| 1093587 | 5/1984 | U.S.S.R. | 296/180 |
| 26230 | 11/1906 | United Kingdom | 296/100 |
| 207524 | 7/1924 | United Kingdom | 296/14 |

Primary Examiner—Margaret A. Focarino
Assistant Examiner—Andrew C. Pike
Attorney, Agent, or Firm—Richard C. Litman

[57] ABSTRACT

A wagon is provided with a superstructure removably attachable to the bed and which includes a pair of sidewall assemblies each having a sidewall to which is pivotally attached a roof member. Power devices on each sidewall are actuated to displace the roof members between an abutting closed position overlying the wagon bed, and an open position fully above the sidewalls and laterally outside the area above the bed. Alignment and latching devices on each roof member are automatically cable controlled during the actuation of the roof members. The opening limits of the roof members is regulated by hinge plates which provide abutments against the sidewalls. An end of the wagon is closable by a pair of removable doors and when the roof members are open, the added elevated cargo space therebetween may be closed at the end of the wagon by a removable end gate removably attached to and spanning the two opened roof members.

12 Claims, 5 Drawing Sheets

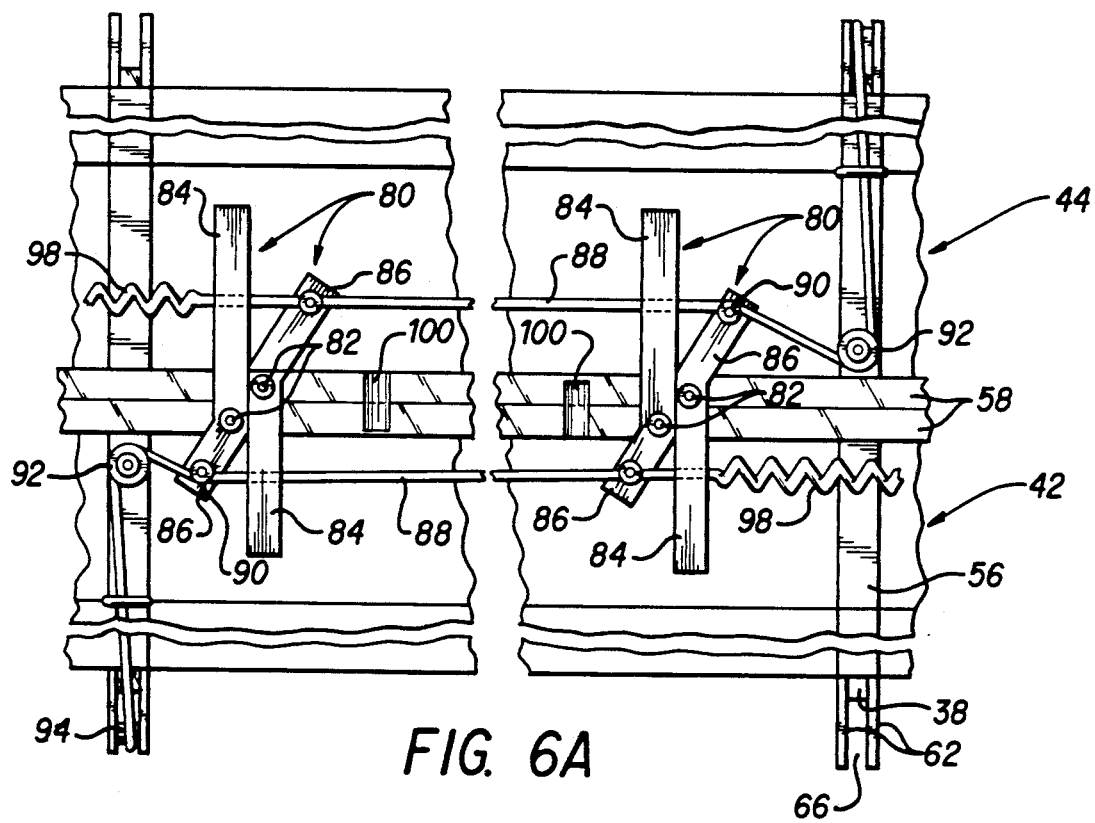
FIG. 6A
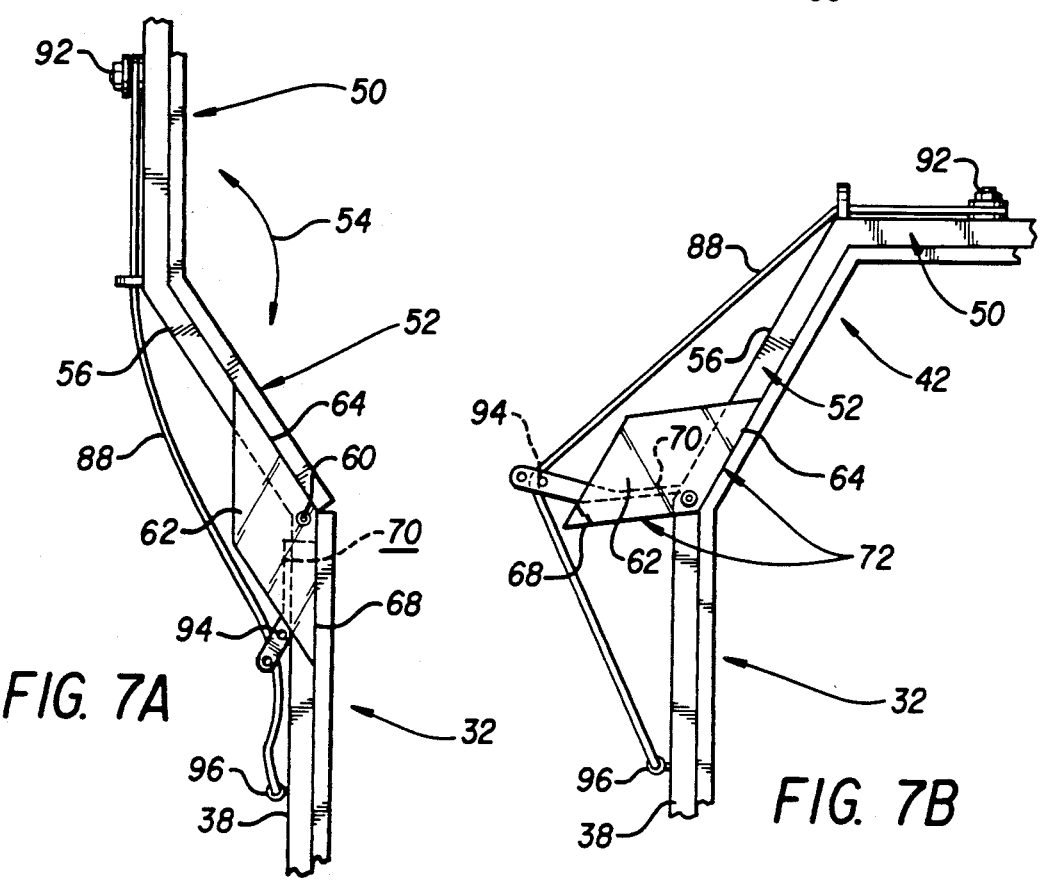
FIG. 7A
FIG. 7B

MULTIPLE-USE WAGON ASSEMBLY

CROSS-REFERENCE TO RELATED APPLICATION

This is a continuation-in-part of application Ser. No. 07/476,303 filed Feb. 7, 1990, now abandoned, which is a continuation-in-part of application Ser. No. 07/299,054 filed Jan. 19, 1989 and now abandoned.

FIELD OF THE INVENTION

This invention relates generally to wagon assemblies and more particularly, to an improved wagon having a generally boxlike superstructure which is either removable in its entirety or, manipulatable to alter the height of the sidewalls to vary the wagon interior configuration and thus, the lading capacity of the wagon.

BACKGROUND OF THE INVENTION

Wagons, and more particularly farm wagons, for use in collecting and transporting various materials or items, such as bales of hay and to aid in performing other tasks are broadly well-known. Many of the known wagons are provided with a bed or platform having sides which can be folded and/or which can be easily removed for storage and/or ease of access. Flatbed trailers or wagons having sockets along the bed sides for the removable reception of stake bodies, are a popular example of the above. Some wagons are also constructed with platforms supporting sides that are flexible and light in weight.

It is desirable to provide a wagon assembly having removable side and end walls and which include displaceable top or roof panels, particularly when the displacement of the top panels provides an increased lading capacity. With such an arrangement, the enclosed, secure transport of material may be achieved over highways while the user has the option of utilizing the same wagon to transport an increased volume of cargo, at least on the owner's premises or over local roads, usually where lesser speeds are involved and vehicle size limitations are relaxed.

By constructing each sidewall of separable upper and lower sections it is possible also to provide alternate cargo configurations wherein, the upper sidewall sections and their roof sections are removed, leaving but the lower sidewall sections to provide a lower height, open top cargo capability.

DESCRIPTION OF THE PRIOR ART

Wagons having a boxlike structure and a hinged roof attached to the sides are generally known. One such structure is shown in U.S. Pat. No. 3,572,811 issued Mar. 3, 1971 which discloses a farm wagon with a partially open end which is provided with a hinged roof which is selectively usable in a raised or elevated position and in a lowered or retracted position. The roof comprises a top panel which has a smooth undersurface and a pair of side panels extending from the side edges of the roof panel in spaced parallel relation to each other. Means are provided for releasably fixing the roof to the walls to maintain the roof in either an elevated or retracted position.

In U.S. Pat. No. 4,405,169 issued Sept. 20, 1983 there is disclosed a platform composed of two sets of frame members, one mounted on top of the other, and a plurality of deck panels mounted on top of the top frame members. Sidewalls retain the deck panels in place whereby the deck is flexible.

A removable attachment for wagon bodies is also shown in U.S. Pat. No. 649,181 issued May 8, 1900. In this example, side, end and top members are adapted to fold inward to form a closed wagon body and to open to an upright position to increase the capacity of the wagon body.

In U.S. Pat. No. 2,551,239 issued May 1, 1951 there is disclosed a vehicle body in which the top comprises hinged sections which may be moved between horizontal and vertical positions. Hydraulic actuators are included to move the top sections.

These and other prior art assemblies disclose various types of attachments for vehicle bodies as well as methods of construction. However, none of them, taken singly or in any combination, are seen to disclose the specific details of the present invention in such a way as to bear upon the claims appended hereto.

SUMMARY OF THE INVENTION

By the present invention an improved wagon assembly is provided having removable, displaceable roof, side and rear panelized components which readily lends itself to offering a wagon or vehicle having multiple uses. In general, removable components include two side assemblies each comprising a sidewall attachable to the bed or platform of the wagon and each supports a roof section having outer and inner edges with the outer edges pivotally attached to the upper edges of the respective sidewall. The sidewalls themselves comprise removably connected upper and lower sections such that various wagon combinations are permissible, with and without the roof sections and offering alternative cargo configurations. Removable end doors complement the side assemblies while a removable end gate is attachable between the opened roof components.

Actuating means on each side assembly are operable to displace the roof sections from an open position where they are in a substantially vertical position, to a closed position where they are in a position overlying the wagon bed. In the closed position the inner edges of the roof sections are side-by-side or juxtaposed and in a horizontal plane substantially elevated above that of the wagon sidewalls while when in the open position, the upstanding roof sections are disposed in planes outside that of the sidewalls. In this manner, the cargo area of the wagon interior is substantially increased, both vertically and transversely.

Displacement of the roof sections between their alternate positions and retention in the closed configuration is accomplished by means of components carried by the two assemblies. Each is provided with a hydraulic cylinder operable to pivot the roof section relative the respective sidewall. The limit of the open disposition of the roof sections is defined by a series of specifically configured hinge plates which serve as abutment devices limiting the opening movement of the roof sections. These same hinge plates additionally function to regulate the operation of cables joined to alignment and latch elements on each roof section so that during the opening and closing of the roof sections, these latch elements are simultaneously shifted between opened and closed positions. In the latter condition, the latch elements as carried by each roof section are displaced to overlie the adjacent roof section to retain it in the closed position.

Accordingly, one of the objects of the present invention is to provide an improved wagon having removable top, rear and side attachment sections.

Another object is to provide a removable wagon superstructure including two assemblies each comprising a sidewall pivotally supporting a roof section and containing a fluid-actuated device operable to open and close the roof section.

A further object of the invention is to provide an assembly for wagons wherein the roof sections include novel alignment and retention means automatically maintaining the inner edges of the sections in a substantially co-planar position when in a closed position.

A still further object is to provide a wagon assembly wherein the removable sidewall sections comprise novel stop means mounted intermediate the upper sidewalls and roof sections to provide an abutment whereby the displacement of the roof sections to the open position is controlled and provides a substantially enlarged cargo area within the wagon, both vertically and transversely.

Another object of the present invention is to provide an improved wagon including a pair of assemblies each comprising a sidewall removably attached to a bed and having a displaceable roof section attached thereon along with an end door section, and an end gate normally stored within one assembly and attachable in a spanning manner to the two roof sections when opened.

A further object of the invention is to provide an improved wagon assembly including sidewalls comprising upper and lower sections usable together to provide a maximum cargo volume enclosed by roof sections carried by the upper sidewall sections or, with only the lower sidewall sections being usable for a reduced volume cargo.

With these and other objects in view which will more readily appear as the nature of the invention is better understood, the invention consists in the novel construction, combination, and arrangement hereinafter more fully illustrated, described, and claimed, with reference being made to the accompanying drawings.

BRIEF DESCRIPTION OF THE DRAWINGS

FIG. 6A is a partial top plan of the roof members and the associated latching and alignment mechanism when in the closed position;

FIGS. 7A and 7B are partial rear elevation views illustrating the cable and hinge plate operation as one roof section is displaced between its two alternate positions.

Similar reference characters designate corresponding parts throughout the several figures of the drawings.

DESCRIPTION OF THE PREFERRED EMBODIMENT

Figure 1:
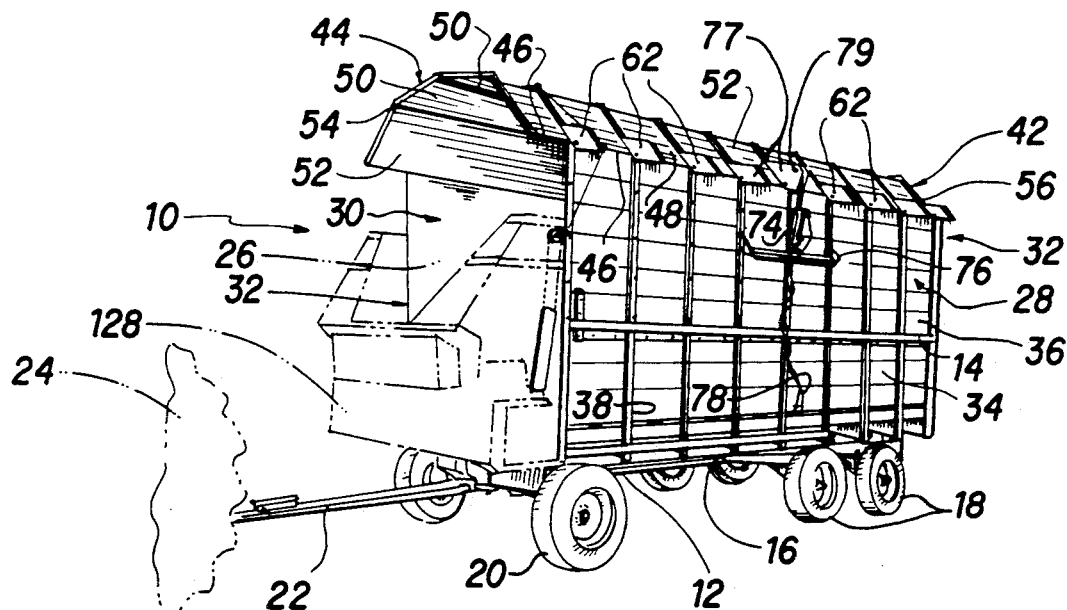
FIG. 1 is a perspective view of the wagon of the invention with the roof sections and sidewalls installed on the wagon bed and depicted in the closed position.
Figure 2:
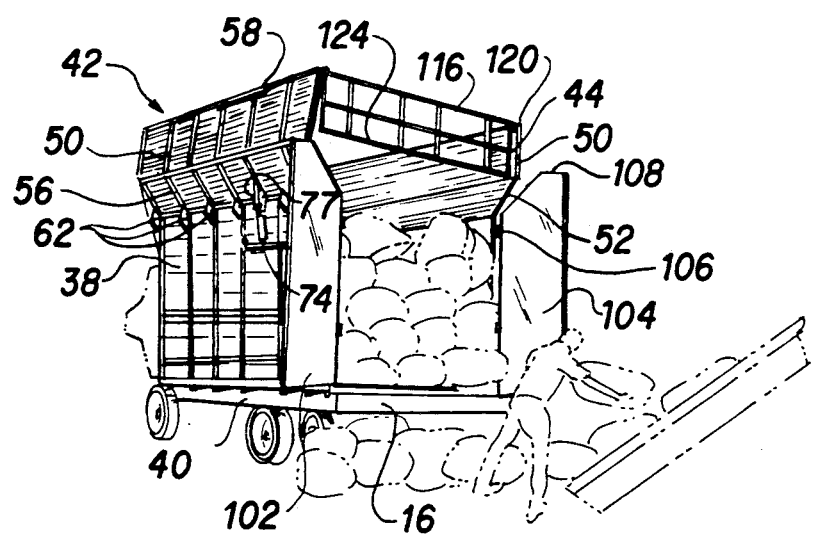
FIG. 2 is a perspective, rear view of the wagon of FIG. 1 as it appears with the end doors and roof sections in the open position, with the stabilizing end gate spanning the open roof sections.

Referring now to the drawings, particularly FIGS. 1 and 2, the present invention will be seen to relate to an improved wagon assembly, generally designated 10 and which includes a wagon 12 containing a superstructure 14. The wagon is provided with a planar platform or bed 16 suitably supported by any appropriate undercarriage having rear wheels 18 and front wheels 20, the latter preferably part of an articulated axle controlled by a tongue or two-bar 22 adapted to be drawn by a tractor or other vehicle 24.

A confined interior or cargo/lading area 26 is formed atop the bed 16 by means of the superstructure 14 of the invention and which includes a pair of panelized lateral sidewall assemblies 28, 30 each comprising a sidewall 32 as formed by a lower section 34 and an attached upper section 36. Each sidewall 32 is formed of suitable planking or the like and includes a plurality of vertical channels 38, the lower ends of which are insertable within sockets 40 or the like in the wagon bed 16 to allow for the removable attachment of the assemblies 28, 30 to the wagon. Likewise, a similar socket joint exists between the lower portion of the upper section channels 38 and the top portion of the lower section channels 38 for reasons which will become apparent hereinafter.

Each lateral assembly 28, 30 includes a roof member 42 or 44 pivotally attached along its lower edge 46 adjacent the top edge 48 of the respective sidewall 32. Each roof member in turn will be seen to comprise an inner section 50 adjacent an outer section 52. As shown most clearly in FIGS. 7A, 7B the adjacent sections 50, 52 are joined to one another to define an interior obtuse angle 54, preferably within the range of 120-150 degrees. These sections are formed with transverse channels or ribs 56 spanned by suitable sheathing such as sheet metal or the like. The channels 56 are spaced and aligned with the sidewall vertical channels 38 and extend from a longitudinal channel 58 forming an inner edge of the roof members, to the roof lower edge 46.

The juxtaposed outer ends of the roof channels 56 and top of the sidewall channels 38 are pivotally joined by means of individual pivot pins 60 to allow displacement of the roof members 42, 44 between the positions shown in FIGS. 1 and 2. Means are provided to restrict and retain the roof members in these two extreme positions. In the case of the opened position of FIGS. 2 and 7A, the upward and outward displacement of the roof members is limited by means of hinge plates 62 having a first edge 64 fixed relative each roof section channel 56 as by welding. Preferably, a pair of these hinge plates 62—62 are applied to the side of each roof member channel 56 and thus provide a space 66 so that the adjacent, angled second edge 68 of each pair of plates will straddle the upper reaches of the sidewall channels 38 when positioned as in FIG. 7A. To serve as a positive abutment when the roof members are thusly displaced, a stop element 70 bridging each pair of hinge plates 62—62 will be seen to provide an extended bearing surface when engaging the sidewall channels 38. The external angle 72 between the hinge plate edges 64 and 68 (and in effect, the stop element 70) is equal to or slightly greater than the aforementioned angle 54 to insure that the inner roof section 50 will be disposed no less than in a vertical plane, when opened. The weight of the opened roof members will thus assist in maintaining the assembly when thusly displaced.

Displacement of the roof members 42, 44 between the alternate positions is achieved by means of actuating or power assist means on each upper sidewall section 36, such as a hydraulic cylinder 74 having one end pivotally anchored to a brace 76 spanning the medial channels 38 on each upper sidewall section 36. The opposite, piston rod end of each cylinder 74 is pivotally attached to the outboard area of a pair of oversize hinge plates 77 installed midway of the length of the wagon, as at 79, with these hinge plates 77 affixed to the adjacent roof section channel 56 similar to the hinge plates 62. With this arrangement, actuation of the cylinders 74 mounted on each sidewall assembly will be understood to pivotally displace the attached hinge plates 77 and accordingly, the affixed roof members 42 and 44 between the respective opened and closed positions. Any suitable well known pump means may be employed to power the cylinders 74 and may be located on the wagon, or connected to the fluid lines 78 from a remote vehicle such as the draft vehicle 24.

Figure 4:
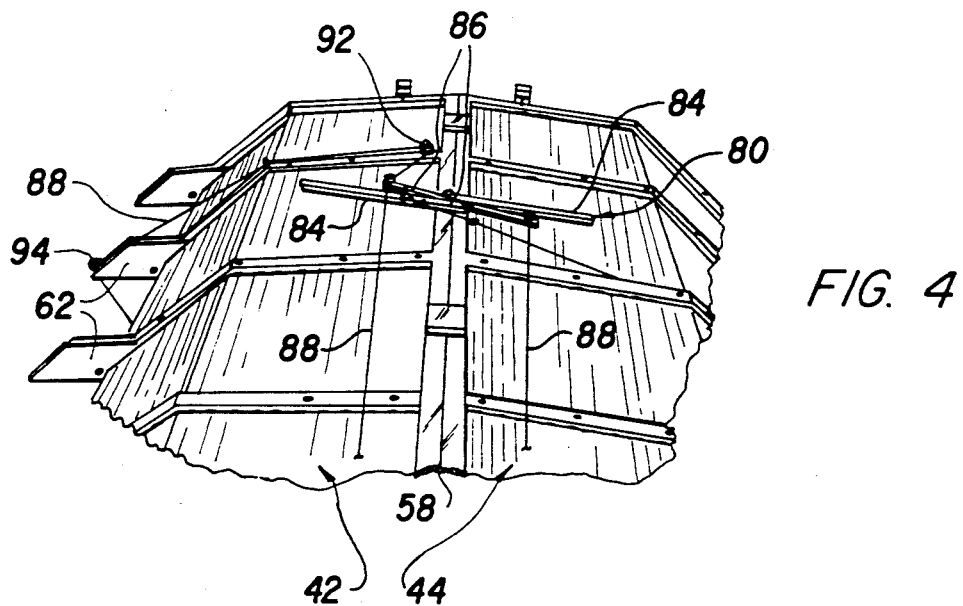
FIG. 4 is a fragmentary top perspective view of the two roof sections and the latching and alignment mechanism carried thereby, shown with the roof sections in the closed position.
Figure 6B:
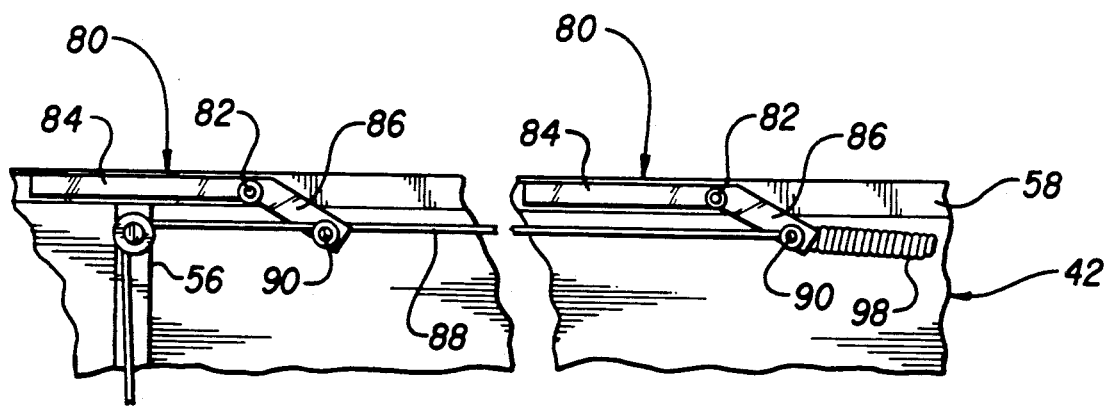
FIG. 6B is a partial top plan illustrating the latching and alignment mechanism as it appears on each roof member when in the open position.

Positive means are provided to insure proper mating and retention of the roof members 42, 44 when displaced to the closed position of FIGS. 1, 4, and 6. As will be seen most clearly in FIG. 6, a plurality of alignment bars 80 are carried on the edge channel 58 of each roof section 50 and each is pivotally attached thereto by a pivot 82. The greater length of each bar 80 comprises an arm 84 while the opposite, offset portion provides a leg 86. Coordinated, simultaneous pivoting of the bars 80 is achieved by a non-stretchable cable 88 affixed by a pivot connection 90 to the distal portion of the leg 86 of the bars on each roof member. Each cable 88 then passes around a bearing or pulley 92 on the respective roof member and is directed transversely to an adjacent pair of hinge plates 62. The cable passes over a bearing element 94 fixed to the hinge plates and is then anchored to the sidewall as at 96.

The length or slack in each cable 88 is selected to insure that, as the roof members are closed, the outward displacement of the diamond-shaped hinge plates 62 and the attached bearing members 94, causes the cables 88 to be pulled to the position of FIG. 7B. During this closing of the roof members, the progressive cable displacement produces a concurrent pivotal movement of the bars 80 to the position of FIG. 6A, from the position of FIG. 6B and wherein the arms 84 of each roof member bar 80 are swung to a position overlying the adjacent roof member. This action occurs against the force as applied by cable return means such as the spring 98 joined to the leg 86 of each bar 80 connected to the end of the cable 88. These springs 98 then act, during the opening of the roof members when the cables 88 are slacked, to displace the bars 80 to the position of FIG. 6B wherein the arms 84 are substantially parallel to the respective roof member edge channels 58. With the bar arms 84 providing for an initial coordination of the closing roof members, a final alignment is assured, by means of alignment plates 100 affixed to each edge channel 58 and projecting to overlie the opposite roof member edge channel.

Figure 3:
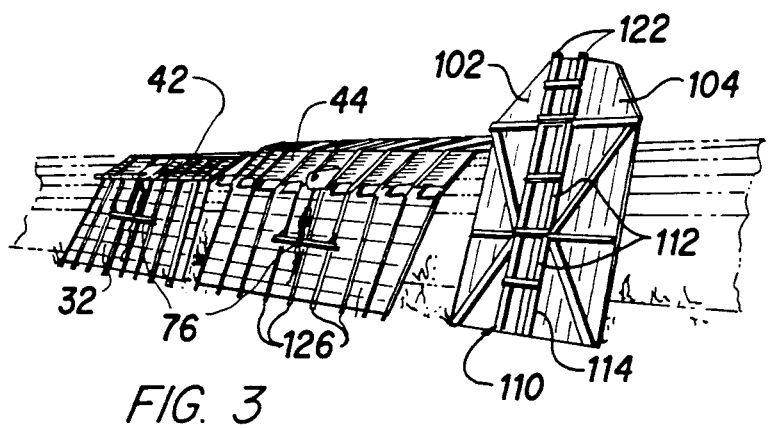
FIG. 3 is a perspective view of the two assemblies of the superstructure and the end doors as removed from the wagon bed.

When the roof members are in either position, a pair of end doors 102, 104 serve to allow closing of one end of the wagon. These doors are removably attached to the respective sidewalls 32, 32 as by separable hinge devices 106 and are provided with angled top edges 108 configured to mate with the roof members when closed. To allow entry into the wagon interior 26 from the rear when the roof members are opened and the end doors closed, a ladder 110 as shown in FIG. 3 is affixed to one door 102 and partially overlaps the other door 104 when closed. For the purposes of clarity in the drawings, the ladder 110 is omitted from the door 102 in FIG. 2. Likewise, access to the closed roof members may be had by this ladder, such as to inspect or service the top thereof. Fasteners 112 through the overlapping ladder siderail 114 and engaging the underlying door 104 may serve to secure the doors in the closed, coplanar condition.

Figure 5:
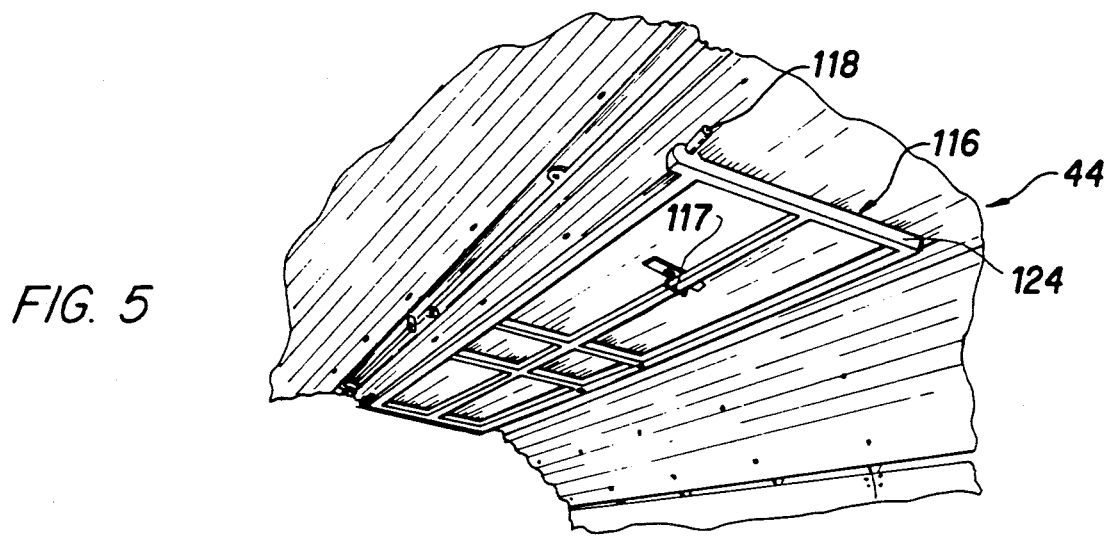
FIG. 5 is a fragmentary bottom perspective view depicting the underside of the roof assembly in a closed position and showing the roof stabilizing end gate in its non-use, stored position.

To provide stabilizing of the opened roof members as in FIG. 2, a removable end gate 116 is attachable to the upstanding roof inner sections 50. When not in use, this gate is conveniently stored beneath either of the roof members as shown in FIG. 5. Suitable clamping means 117 permits quick removal from this stored position while pins 118 or the like on the gate ends allow for attachment to the roof members as at 120 in FIG. 2. As will be seen in FIG. 3, the top of the ladder siderails extend above the end doors 102, 104 and include fasteners 122 engageable with the end gate bottom rail 124 to further secure the end doors when closed and the roof members are opened.

Figure 8:
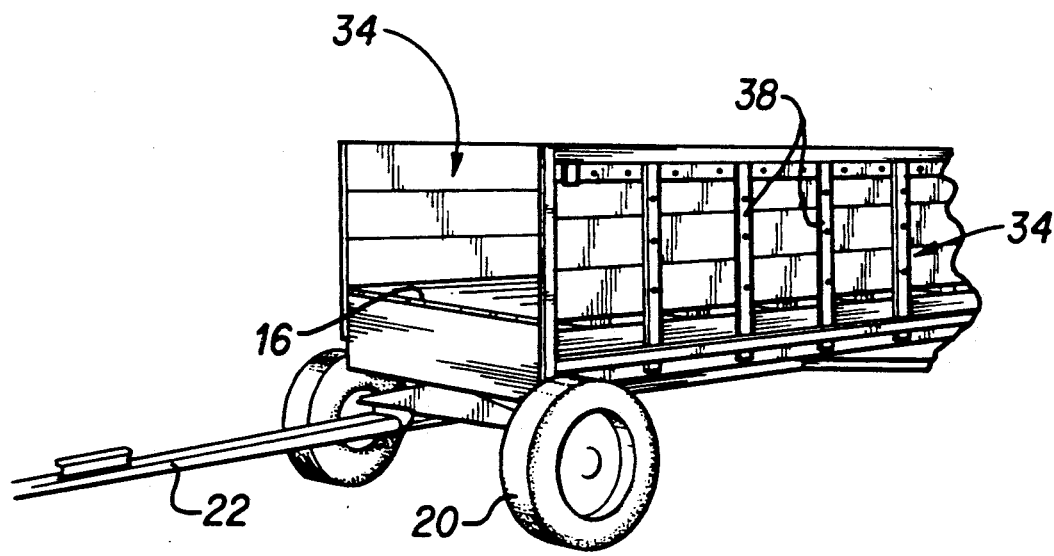
FIG. 8 is a partial perspective view of an alternative embodiment wherein the upper sidewall sections are removed, leaving the lower sidewall sections attached to the wagon bed to provide a reduced wagon capacity.

With the above construction in mind, it will be appreciated that the wagon 10 may be alternately utilized to achieve various lading capacities and with or without an enclosing roof. The maximum enclosed capacity will be as in FIG. 1 while this capacity may be increased by opening the roof members 42, 44 as in FIG. 2. In this latter mode, not only is the vertical capacity increased but also, the resultant added contained volume will be understood to be increased laterally or transversely, in view of the disposition of the raised roof members outside the vertical plane of the sidewalls 32, 32. Alternatively, the upper sidewall sections 36, 36 and their attached roof members 42, 44 may be removed and set aside with the end doors 102, 104 as in FIG. 3. This is readily accomplished as the lower end of the upper section channels 38 are provided with pins 126 insertable within the top of the channels 38 of the lower sidewall sections 34. The resultant configuration will be as in FIG. 8.

The wagon 10 may be utilized for any of several purposes. Obviously, bales of hay or sacks of feed/grain may be transported as in FIG. 2. Any well known accessory device may be combined with the wagon. For example, a silage loading apparatus 128 may be mounted in the front as in FIG. 1 or, a manure or feed spreader device (not shown) mounted in the rear.

While I have illustrated and described the preferred form of construction for carrying out the invention, this form is capable of variation and modification without departing from the spirit of the invention. I therefore do not wish to be limited to the precise details of construction as set forth, but desire to avail myself of such modifications and variations as come within the scope of the appended claims.

I claim:

1. A multiple-use wagon assembly comprising:
   a bed supported on an undercarriage,
   a pair of laterally spaced apart sidewalls extending upwardly from said bed and each having a top edge, said pair of sidewalls defining a cargo space therebetween,
   a roof member attached adjacent each said sidewall top edge and including adjacent inner and outer roof sections, each said inner roof section having an inner edge,
   hinge means pivotally joining each said roof member outer section to one said sidewall top edge,
   actuating means on each said sidewall operable to displace said roof members about said hinge means from a closed position wherein said inner roof section inner edges are substantially juxtaposed atop said bed and between said sidewalls, to an open position wherein said roof members are in a generally vertical disposition above respective ones of said sidewalls,
   alignment means on at least one said roof member adjacent said inner section inner edge,
   said alignment means including a pivotally mounted elongated member having an arm and opposite leg, and
   a cable joined between said elongated member and one said sidewall, whereby
   operation of said actuating means simultaneously pivots said roof members about said hinge means and pivots said elongated member arm and leg, with said arm moving from a position overlying both said inner section inner edges when said roof members are in a closed position, to a position wherein said arm is removed from overlying both said inner section inner edges, when said roof members are in an open position.

2. A multiple-use wagon assembly according to claim 1 further including
   an end door pivotally attached to each said sidewall.

3. A multiple-use wagon assembly according to claim 2 further including
   a ladder attached to at least one said end door.

4. A multiple-use wagon assembly according to claim 1 wherein
   each said sidewall comprises an upper section removably attached to a lower section, whereby
   said sidewall upper sections with said roof members may be removed leaving said sidewall lower sections extending upwardly from said bed and providing a reduced volume cargo space.

5. A multiple-use wagon assembly according to claim 1 further including
   an end gate having opposite ends removably attached to said roof member inner sections when said roof members are in said open position.

6. A multiple-use wagon assembly according to claim 5 further including
   clamping means on one said roof member engageable with said end gate to allow storage of the end gate when not attached to said roof member inner sections.

7. A multiple-use wagon assembly according to claim 1 wherein
   said roof member inner and outer sections include undersurfaces defining an obtuse angle therebetween, whereby
   an arched roof line is defined when said roof members are in the closed position.

8. A multiple-use wagon assembly according to claim 7 wherein
   said obtuse angle is within the range of 120-150 degrees.

9. A multiple-use wagon assembly according to claim 7 wherein
   each said roof member when in an open position presents said outer section in a plane inclined outwardly from a respective attached said sidewall thereof with each said inner section disposed in a substantially vertical plane lying outside the plane of the respective sidewall thereof, whereby
   a substantially increased cargo space is provided between said roof members when in the open position.

10. A multiple-use wagon assembly according to claim 1 wherein
    each said hinge means includes an angular plate having a first edge fixed relative one said roof member outer section,
    an angularly offset second edge on said angular plate, and
    stop means adjacent said second edge engageable with one said sidewall when each said roof member is disposed in the open position.

11. A multiple-use wagon assembly according to claim 1 including
    a plurality of said elongated members on each said roof member, and
    one said cable serially connected to all said plurality of elongated members on each said roof member.

12. A multiple-use wagon assembly according to claim 1 further including
    spring means acting on said elongated member to urge said elongated member arm to remain overlying said roof member to which it is pivotally mounted when said roof member is in the open position.

* * * * *